United States Patent [19]

Ishiguro

[11] Patent Number: 5,133,609
[45] Date of Patent: Jul. 28, 1992

[54] SEAL FOR A ROLLING BEARING WITH A ROTATABLE OUTER RACE

[75] Inventor: Kenji Ishiguro, Toyama, Japan
[73] Assignee: Kabushiki Kaisha Fujikoshi, Toyama, Japan
[21] Appl. No.: 691,317
[22] Filed: Apr. 29, 1991
[30] Foreign Application Priority Data
Apr. 28, 1990 [JP] Japan .................................. 2-46255
[51] Int. Cl.⁵ .......................................... F16C 33/72
[52] U.S. Cl. ...................................... 384/486; 384/477
[58] Field of Search ................. 384/477, 484, 485, 486

[56] References Cited

U.S. PATENT DOCUMENTS

| | | | |
|---|---|---|---|
| 3,642,335 | 2/1972 | Takahashi et al. | 384/485 X |
| 4,505,484 | 3/1985 | Ohkuma et al. | 384/486 X |
| 4,958,942 | 9/1990 | Shimizu | 384/486 |

FOREIGN PATENT DOCUMENTS 197329 12/1986 Japan .
199534 12/1987 Japan .

Primary Examiner—Thomas R. Hannon
Attorney, Agent, or Firm—Spencer, Frank & Schneider

[57] ABSTRACT

A resilient seal for a rolling bearing having an outer peripheral edge secured in a circumferential groove of an outer race and an inner peripheral end directed toward the outer periphery of a groove of an inner race. The seal is reinforced by a circular reinforcing core and includes a center lip and an inner lip both at the inner peripheral end thereof. The center lip extends radially inwardly from a thick rigid portion of the seal formed adjacent to the inner end of the circular reinforcing core to always contact the side outer wall of the groove of the inner race irrespective of the axial relative movement between the inner and outer races. The inner lip is thin and extends toward and below the top of the side inner wall of the groove of the inner race to form a labyrinth clearance therebetween. When the outer race is rotated at high speed, the inner lip is moved to decrease the labyrinth clearance by a centrifugal force in proportion to the rotational speed of the outer race.

5 Claims, 4 Drawing Sheets

SEAL FOR A ROLLING BEARING WITH A ROTATABLE OUTER RACE

BACKGROUND OF THE INVENTION

The present invention relates to a bearing seal having one end fit in a seal groove formed in the inner peripheral edge of an outer race, and the other end extending toward a groove formed in the outer peripheral edge of an inner race, and in particular, to a seal suitable for a prelubricated rolling bearing with a non-rotable inner race and a rotatable outer race.

An electromagnetic clutch used in an air conditioner or a super charger for vehicles typically employs a rolling bearing of the type which includes a non-rotatable inner race and a rotatable outer race. Recently, such a rolling bearing has been used under severe operating conditions, e.g., at high temperature and particularly in applications where it is required to rotate at high speeds. While the bearing is being rotated at a high speed, grease may leak from the bearing, or grease may vaporize at high temperature. The grease in vapor form leaks from a seal lip and is then scattered directly over a clutch disk. This results in slippage of the clutch disk.

FIG. 5 shows a prior art electromagnetic clutch for use in a supercharger. In FIG. 5, a rolling bearing B' includes balls in rows and engages the inner surface 16 of a clutch disk A. The bearing has an outer race with which a grease catcher C is contacted. As shown in FIG. 6, which is an enlarged partial view of the rolling bearing B' a circular reinforcing core 10a is, for example, used to reinforce a resilient seal 1a. The resilient seal 1a extends between a seal groove 3 formed in the inner peripheral edge of an outer race 2 and a corresponding groove 5 formed in an inner race 4. The resilient seal 1a has an inner lip 9a axially extending toward an inner wall 8 of the groove 5 and a center lip 7a extending from the inner lip 9a for sliding contact with an outer wall 6 of the groove 5 of the inner race. The center lip 7a is thin and highly resilient.

Another seal is disclosed in Japanese laid-open utility model publication No. 199534/87. As shown in FIG. 7, a resilient seal 1b extends from a seal groove of an outer race (not shown) into a groove 5 of an inner race and has a thin base portion R. A first lip 9b extends axial inwardly and then radially inwardly from the base portion R of the seal and terminates at the inner wall 8 of the groove 5. A second seal lip 7b has an L shape and extends axially outwardly to face the outer wall 6 of the circumferential groove 5 of the inner race leaving a labyrinth clearance therebetween.

The prior art seal 1a of FIG. 6 may accommodate axial displacement of the outer and inner races which may result when the outer race is rotated at a high speed and provide the desired seal integrity. However, in order to secure high seal integrity at high speed and high temperature, means must be provided to reduce the tolerances of associated parts (accuracy in shape and size of a seal and position of grooves in inner and outer races). This results in an increase in production cost. Since centrifugal force is increased in proportion to the square of the rotation speed of the outer race, grease moves strenuously and is vaporized when the rotational speed of the outer race increases. The grease in vapor form tends to be scattered externally of the bearing. Additionally, the air around the outer surface of the seal is agitated in response to the rotation of the outer race. This causes entry of foreign matter into the bearing. To this end, the labyrinth should be narrower when the outer race is rotated at high speed. In the first mentioned prior art seal 1a, the inner lip 9a is generally thick. As a result, centrifugal force is hardly applied to the inner lip, and the labyrinth clearance can not be reduced. The prior art seal 1a is not satisfactory at high speeds. In the second mentioned prior art seal 1b, although the base portion R of the seal lips is so thin that all the lips are moved together upon application of a centrifugal force since the inner lip 9b always contacts the inner wall 8, the labyrinth clearance t cannot be reduced sufficiently. Thus, desired seal integrity can not be achieved as such.

SUMMARY OF THE INVENTION

It is the object of the present invention to eliminate the foregoing disadvantages of the prior art and to provide a seal for a rolling bearing in which the integrity of the seal is excellent and which completely eliminates the scattering of lubricant without the need for incorporating a grease catcher into an associated system with the bearing.

Another object of the present invention is to provide a seal for a rolling bearing which has excellent sealing performance under high-speed and high-temperature operating condition, and results in low torque under high-speed operation.

Still another object of the present invention is to provide a seal for a rolling bearing having wide spaces between lips facing the groove of an inner race so that lubricant may be collected therein preventing leakage of lubricant as well as preventing entry of foreign matter.

To achieve such objects, the seal for a rolling bearing comprises an outer peripheral edge press fitted and secured in a circumferential groove formed in the inner periphery of an outer race, a circular reinforcing core, a center lip extending radially inwardly from near the inner end of the circular reinforcing core and which is always in sliding contact with an outer wall of a groove formed in the outer periphery of an inner race, and an inner lip extending toward and below the top of an inner wall of the groove of the inner race. Between the end of the inner lip and the inner wall of the groove, a labryinth clearance is formed. The center lip is flexible and has a center point of bending about which the center lip is moved. The inner lip is made flexibly thin and has another center point of bending about which the inner lip is moved. Both the center and inner lips are moved independently from each other. When the outer race is rotated at high speed, the center lip is always in sliding contact with the outer wall of the groove irrespective of the axial relative movement between the inner and outer races. The inner lip is moved by centrifugal force to decrease the labyrinth clearance in proportion to the rotational speed of the outer race, or the inner lip is eventually brought into sliding contact with the inner wall of the groove. This results in a substantial improvement in the integrity of the seal.

BRIEF DESCRIPTION OF THE DRAWINGS

For a better understanding of the invention, an embodiment thereof will now be described in detail, by way of a nonlimiting example, with reference to the annexed drawings, in which.

DESCRIPTION OF THE PREFERRED EMBODIMENTS

Figure 1:
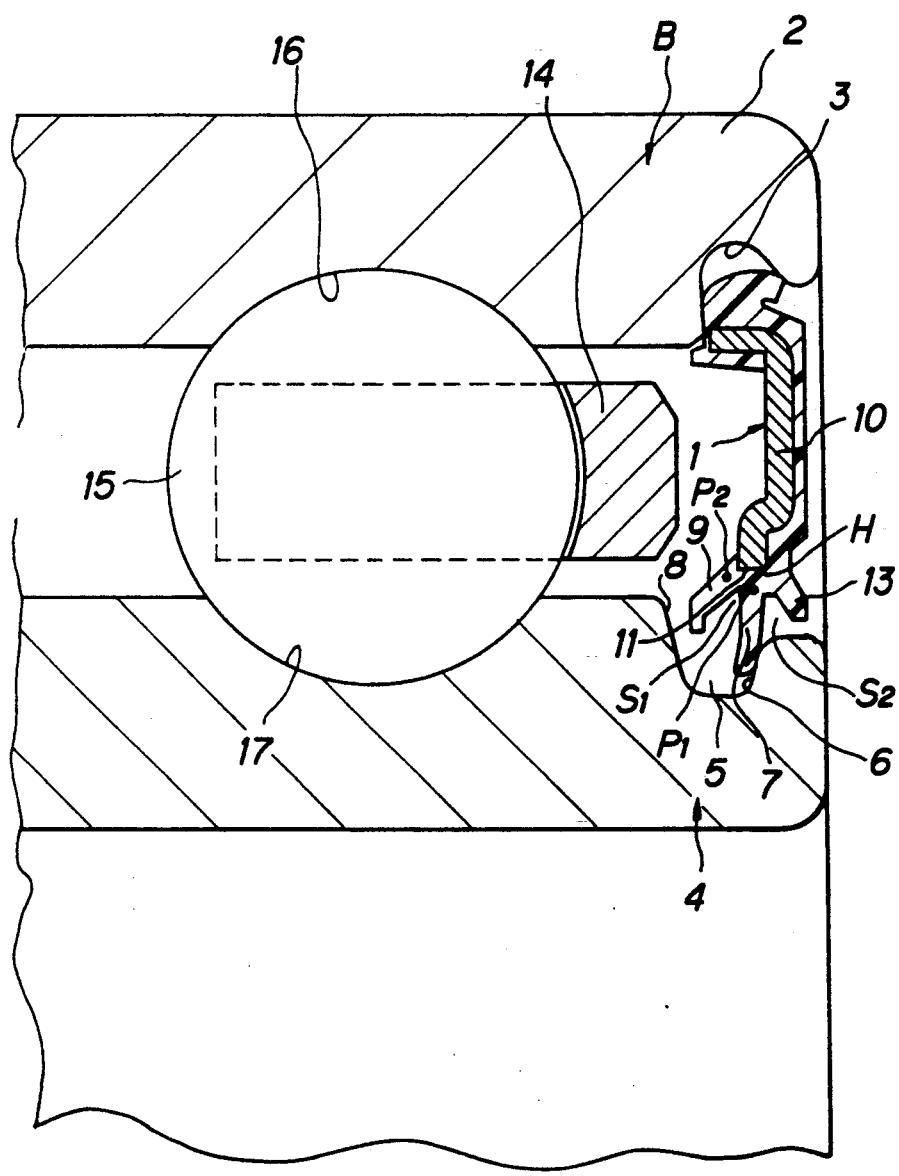
FIG. 1 is a partial sectional view of a double row rollingbearing incorporating a seal of the present invention.

The present invention will now be described in detail by way of example with reference to FIG. 1. A rollingbearing B, shown with a seal of the present invention, is a double row ball bearing although only one row is shown in FIG. 1. Raceway tracks 16 are formed in two rows in the inner periphery of an outer race 2. Raceway tracks 17 are correspondingly formed in two rows in the outer periphery of an inner race 4. A multiplicity of balls 15 are received in each raceway track at equal intervals and each is rotatable about its own center as well as about the axis of the bearing.

A V-shaped circumferential groove 3 is formed adjacent the inner peripheral edge of the outer race 2. A seal 1 has an outer peripheral edge press fitted and secured in the V-shaped circumferential groove 3. A V-shaped or U-shaped groove 5 is formed adjacent the outer peripheral edge of the inner race 4. Lips 9, 7 and 13 extend from an inner rigid base portion H of the seal 1 into the groove 5. A circular reinforcing core 10 has a U section and is embedded in the seal 1 for reinforcing purposes. The seal 1 includes a center lip 7 and an inner lip 9. The center lip 7 extends radially inwardly from near an inner end 11 of the circular reinforcing core 10 so as to always be in sliding contact with an outer wall 6 of the groove 5 of the inner race 4. The inner lip 9 is thin and extends radially inwardly and downwardly from the inner end 11 of the circular reinforcing core 10 toward an inner wall 8 of the groove 5 of the inner race. The seal is reinforced by the circular reinforcing core 10 and is thickened adjacent to the inner end 11 of the circular reinforcing core 10 to provide the rigid portion H. By this arrangement, a center point $P_1$ of bending about which the center lip 7 is moved and another center point $P_2$ of bending about which the inner lip 9 is moved are independently situated adjacent the rigid portion H of the lip near the inner end 11 of the circular reinforcing core 10.

A space $S_1$ is defined between the center lip 7 and the inner lip 9. Another space $S_2$ is defined between the center lip 7 and the outer lip 13. Grease in vapor form and foreign matter may be received in the spaces $S_1$ and $S_2$.

Figure 4:
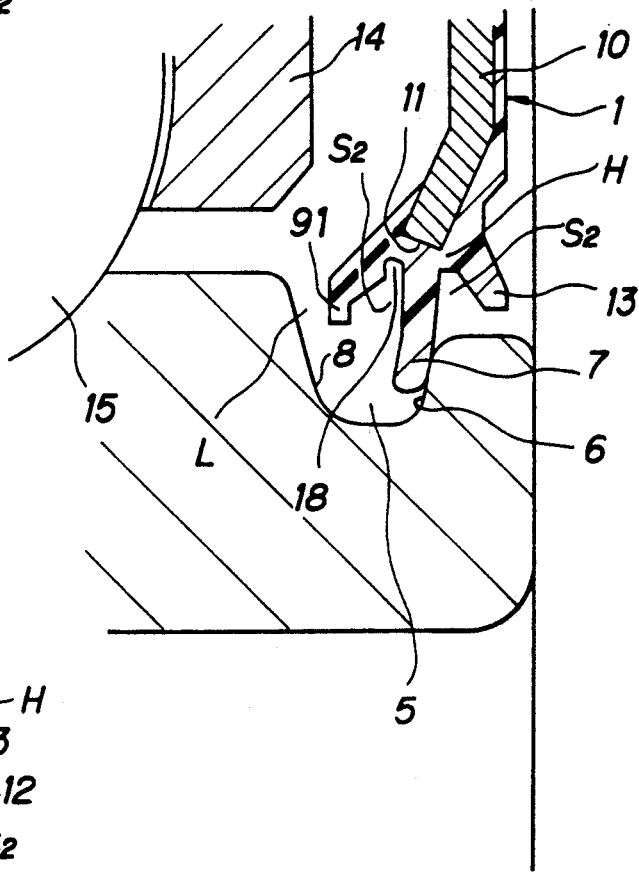
FIG. 4 is a partial sectional view of another embodiment of the present invention.

FIG. 4 illustrates another embodiment of the present invention. In this case, the center lip 7 and the outer lip 13 are identical in structure to those in the previous embodiment. The inner lip 91 extends from near the rigid portion H of the inner end 11 of the circular reinforcing core 10, but in this embodiment, is thinned at its base portion to provide an annular recess 18. This allows the inner lip 91 to move about the annular recess 18 independently of the center lip.

Figure 2:
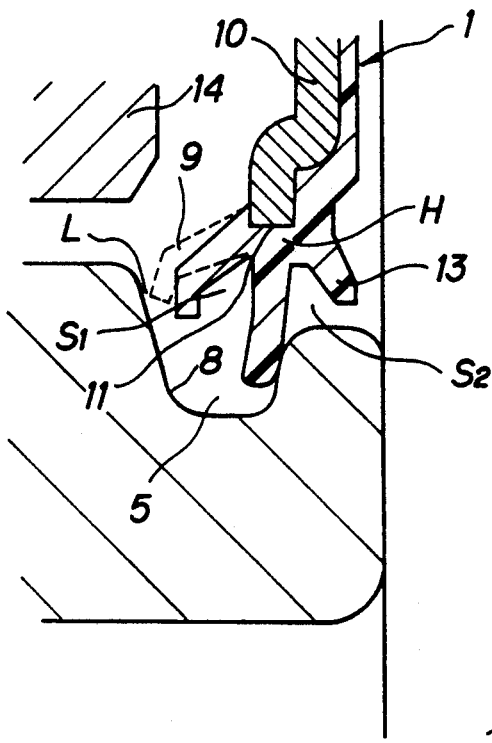
FIG. 2 is a partial sectional view showing the manner in which an inner lip shown in FIG. 1 is moved during rotation of an outer ring.
Figure 3:
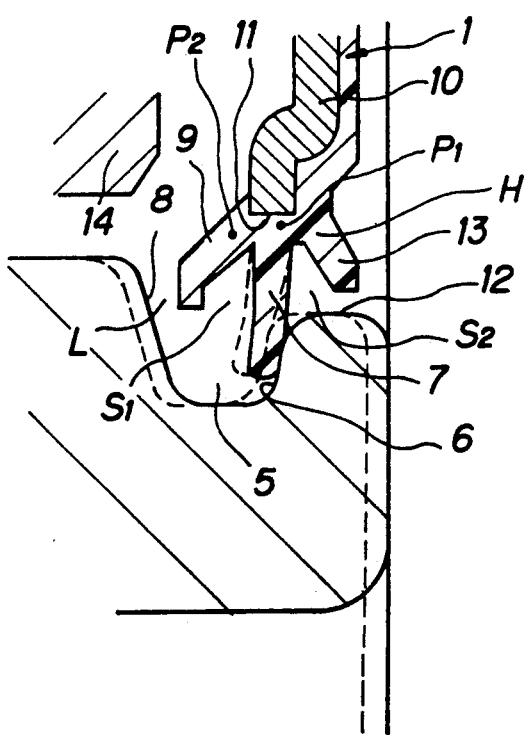
FIG. 3 is a partial sectional view showing axial displacement of the inner race and movement of each lip shown in FIG. 1.
Figure 5:
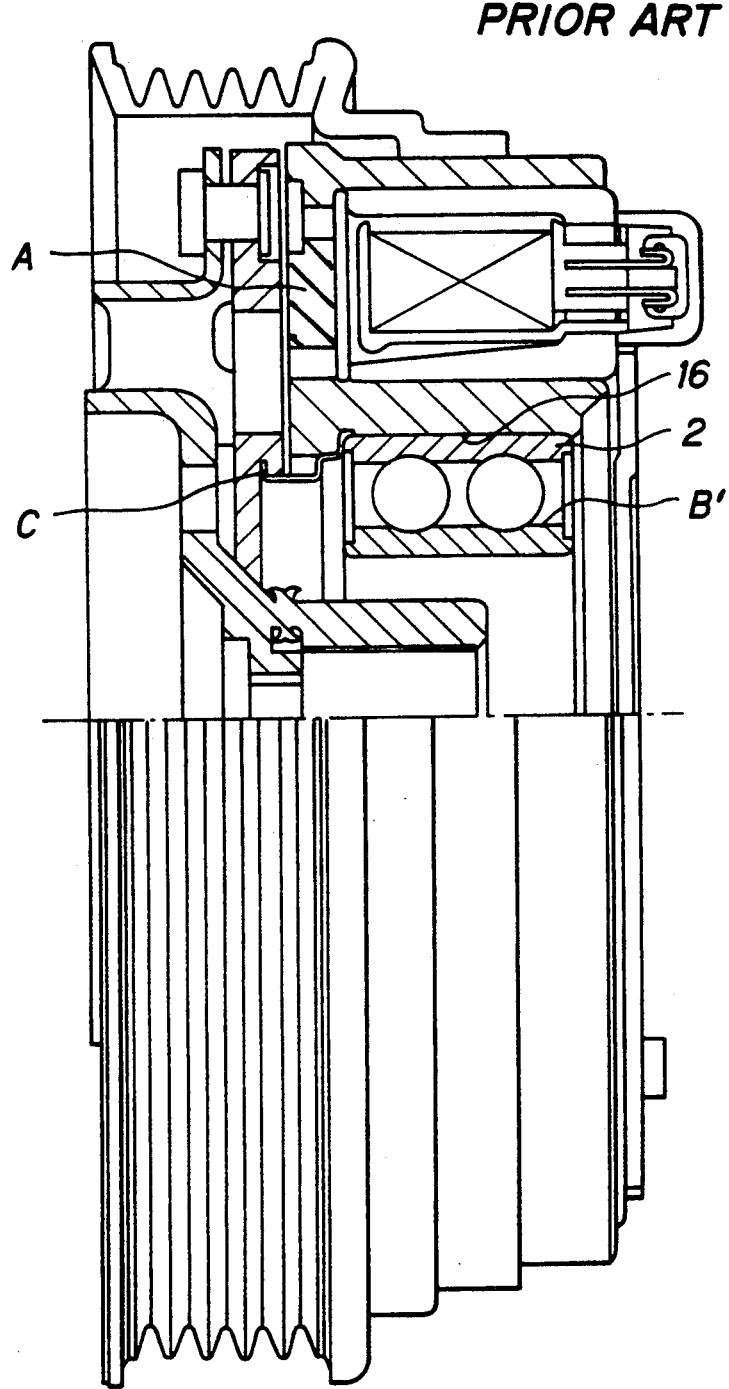
FIG. 5 is a partial sectional side view of an electromagnetic clutch incorporating a double row rollingbearing with a prior art seal.
Figure 6:
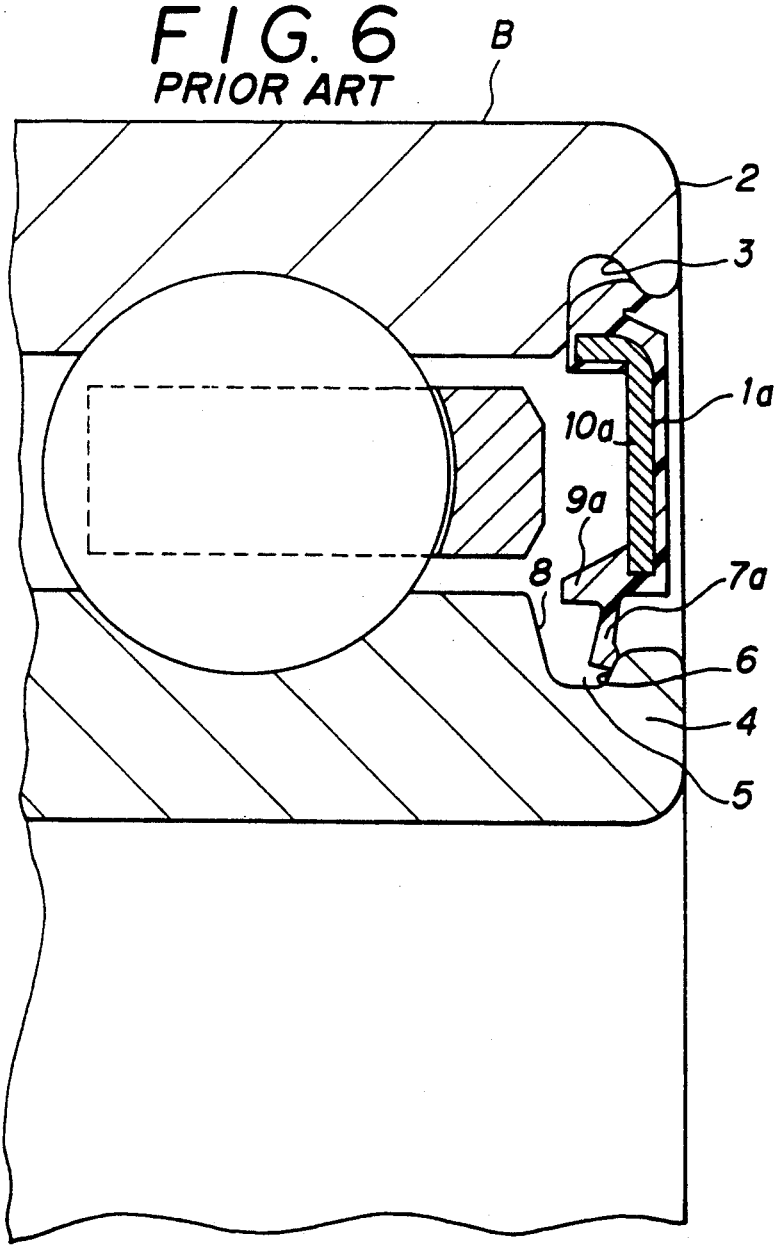
FIG. 6 is a partial sectional view of a rollingbearing with the conventional seal of FIG. 5.
Figure 7:
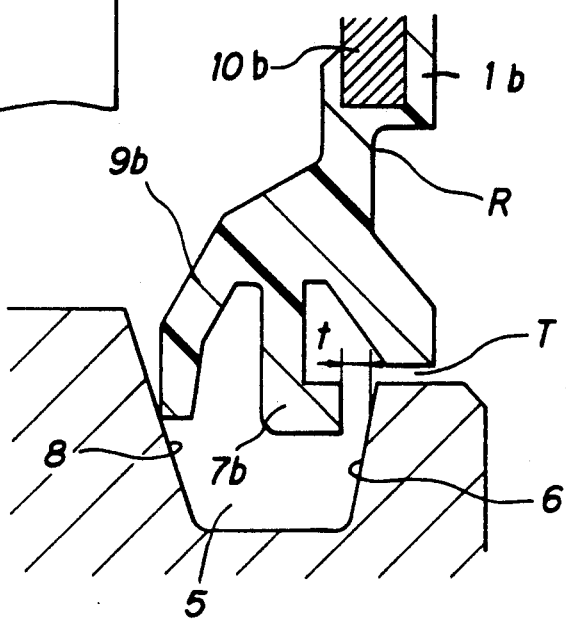
FIG. 7 is a partial sectional view of a rollingbearing with another conventional seal.

Referring to FIGS. 1-3, even if the circumferential groove 3 of the outer race 2 and the groove 5 of the inner race 4 are displaced relative to one another during rotation of the outer race, as shown by the broken line in FIG. 3, due, for example, to inaccurate axial clearance or inaccurate positioning of the raceway tracks 16 and 17, either the center lip 7 or the inner lip 9 comes into light contact with the outer wall 6 or the inner wall 8 of the groove 5 of the inner race 4 so as to achieve the desired seal integrity.

A labyrinth clearance L is formed between the end of the inner lip 9 and the inner wall 8 of the groove 5. The point $P_2$ of bending of the inner lip 9 is different in position from the point $P_1$ of support for the center lip 7. The inner lip 9 can thus be moved up by centrifugal force. The greater the speed of rotation of the outer race, the greater the axially inward movement of the inner lip 9. The inner lip 9 is radially outwardly moved in proportion to the centrifugal force so as to reduce the labyrinth clearance L and eventually contact the inner wall 8 of the groove 5.

Advantages of the present invention will be clear from the foregoing description. Specifically, the seal is reinforced by the circular reinforcing core and thickened adjacent to the inner end of the circular reinforcing core to provide the rigid portion H from which the center, inner and outer lips extend. The center lip is always in contact with the groove of the inner race, whereas the inner lip is moved about its center point of bending by a centrifugal force produced in response to the speed of rotation of the outer race. This movement of the inner lip reduces the labyrinth clearance and causes the inner lip to come into contact with the groove of the inner race. This results in a substantial improvement in the integrity of the seal and completely eliminates slippage of a clutch disk due to scattering of lubricant without the need to incorporate a grease catcher into an associated system with the bearing.

The space $S_1$ between the center lip and the inner lip is so wide that lubricant may be collected therein. This not only prevents leakage of the lubricant, but also entry of foreign matter, thereby substantially improving the seal integrity.

We claim:

1. In a rolling bearing including a resilient seal having an outer peripheral edge press fitted and secured in a circumferential groove formed in the inner periphery of an outer race, and an inner peripheral end directed toward the outer periphery of a groove formed in the outer periphery of an inner race, said resilient seal being reinforced by a circular reinforcing core and including a plurality of lips at the inner peripheral end thereof, at least one of which is slidable on a side wall of the groove of the inner race, wherein the improvement comprises that said lips include a center lip extending radially inwardly from a thick rigid portion of the seal formed adjacent to the inner end of said circular reinforcing core to always contact the side outer wall of the groove of the inner race, a thin inner lip extends toward and below the top of the side inner wall of the groove of the inner race and forms a labyrinth clearance therebetween, and an outer lip extends toward an outer end of the inner race, said center and inner lips having respective center points of bending adjacent the rigid portion so that the center and inner lips are independently bendable thereabout, whereby when the outer race is rotated at high speed, the center lip is always in sliding contact with the outer wall of the groove irrespective of axial relative movement between the inner and outer races, and the inner lip is moved to decrease the labyrinth clearance by a centrifugal force in proportion to the rotational speed of the outer race.

2. A seal for a rolling bearing according to claim 1, wherein said center and inner lips cooperate to define a large clearance therebetween.

3. A seal for a rolling bearing according to claim 1, wherein said inner lip is thinner than said center lip.

4. A seal for a rolling bearing according to claim 1, wherein said inner lip has a thin portion at its base end to provide an annular recess.

5. A rolling bearing having inner and outer races comprising
   a circular reinforcing core;
   a resilient seal reinforced by said circular reinforcing core, said resilient seal including
      an outer peripheral edge secured in a circumferential groove formed in the inner periphery of the outer race;
      an inner peripheral end directed toward the outer periphery of a groove formed in the outer periphery of the inner race; and
   a plurality of lips at the inner peripheral end thereof, said lips including a center lip extending radially inwardly from a thick rigid portion of the seal formed adjacent to the inner end of said circular reinforcing core to always contact the side outer wall of the groove of the inner race, a thin inner lip extending toward and below the top of a side inner wall of the groove of the inner race to form a labyrinth clearance therebetween, and an outer lip extending toward an outer end of the inner race, said center and inner lips having respective center points of bending adjacent said rigid portion so that the center and inner lips are independently bendable thereabout, whereby when the outer race is rotated at high speed, the center lip is always in sliding contact with the outer wall of the groove irrespective of axial relative movement between the inner and outer races, and the inner lip is moved by centrifugal force to decrease the labyrinth clearance in proportion to the rotational speed of the outer race.

* * * * *